(12) United States Patent
Kim et al.

(10) Patent No.: US 10,117,269 B2
(45) Date of Patent: Oct. 30, 2018

(54) METHOD AND DEVICE FOR TRANSMITTING AND RECEIVING DATA IN WIRELESS ACCESS SYSTEM SUPPORTING UNLICENSED BAND

(71) Applicant: LG ELECTRONICS INC., Seoul (KR)

(72) Inventors: Seonwook Kim, Seoul (KR); Seungmin Lee, Seoul (KR); Kijun Kim, Seoul (KR); Suckchel Yang, Seoul (KR); Jonghyun Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 15/306,047

(22) PCT Filed: Apr. 23, 2015

(86) PCT No.: PCT/KR2015/004054
§ 371 (c)(1),
(2) Date: Oct. 21, 2016

(87) PCT Pub. No.: WO2015/163707
PCT Pub. Date: Oct. 29, 2015

(65) Prior Publication Data
US 2017/0041947 A1 Feb. 9, 2017

Related U.S. Application Data

(60) Provisional application No. 61/983,422, filed on Apr. 23, 2014.

(51) Int. Cl.
*H04W 72/14* (2009.01)
*H04W 16/14* (2009.01)
(Continued)

(52) U.S. Cl.
CPC ............ *H04W 72/14* (2013.01); *H04W 16/14* (2013.01); *H04W 72/0446* (2013.01); *H04W 74/006* (2013.01); *H04W 92/10* (2013.01)

(58) Field of Classification Search
CPC .... H04L 5/0091–5/0098; H04W 16/02–16/16; H04W 28/0205;
(Continued)

(56) References Cited

U.S. PATENT DOCUMENTS

| 2012/0177017 | A1  | 7/2012 | Gong et al. |
| 2013/0077554 | A1  | 3/2013 | Gauvreau et al. |
| 2016/0233989 | A1* | 8/2016 | Belghoul ............... H04L 1/1887 370/280 |

FOREIGN PATENT DOCUMENTS

| KR | 1020130093522 | | 8/2013 | |
| KR | 20140010385 A | * | 1/2014 | ............. H04L 5/001 |

(Continued)

OTHER PUBLICATIONS

PCT International Application No. PCT/KR2015/004054, Written Opinion of the International Searching Authority dated Aug. 6, 2015, 16 pages.

*Primary Examiner* — Timothy J Weidner
(74) *Attorney, Agent, or Firm* — Lee Hong Degerman Kang & Waimey

(57) ABSTRACT

The present invention provides one of embodiments comprising: receiving an upper layer signal including configuration information which indicates the size and use of the TxOP period in a primary cell (Pcell); receiving a scheduling grant including scheduling information on the TxOP period in a first subframe of the TxOP period; and transmitting and receiving data according to the use of the TxOP period on the basis of the scheduling information in a secondary cell (Scell) during the TxOP period, wherein the size of the TxOP period is defined by the number of subframes of the
(Continued)

Scell and the use of the TxOP period is set by a downlink data transmission or an uplink data transmission, wherein whether the subframes of the Scell are included in the TxOP period can be determined according to a transmission direction of subframes of the Pcell corresponding to the subframe of the Scell.

14 Claims, 16 Drawing Sheets

(51) Int. Cl.
*H04W 72/04* (2009.01)
*H04W 74/00* (2009.01)
*H04W 92/10* (2009.01)

(58) Field of Classification Search
CPC ............... H04W 28/0252–28/0263; H04W 28/08–28/085; H04W 36/14–36/385; H04W 48/08–48/16; H04W 72/005–72/14; H04W 74/002–74/0891; H04W 76/10–76/38; H04W 92/10
See application file for complete search history.

(56) References Cited

FOREIGN PATENT DOCUMENTS

| KR | 1020140010385 | 1/2014 | |
|---|---|---|---|
| WO | 2012067333 | 5/2012 | |
| WO | WO 2012067333 A1 * | 5/2012 | ............. H04L 5/001 |

* cited by examiner

FIG. 9
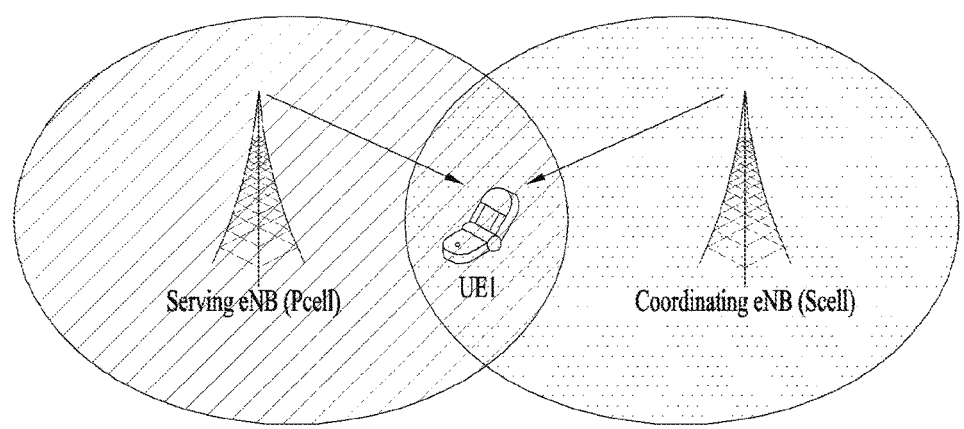
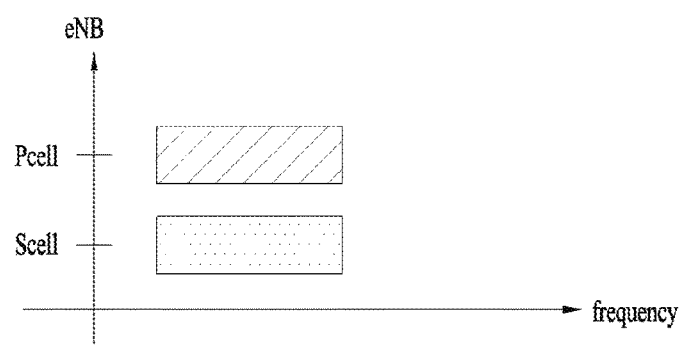

ion No. PCT/KR2015/004054, filed on Apr. 23, 2015, which claims the benefit of U.S. Provisional Application No. 61/983,422, filed on Apr. 23, 2014, the contents of which are all hereby incorporated by reference herein in their entirety.

METHOD AND DEVICE FOR TRANSMITTING AND RECEIVING DATA IN WIRELESS ACCESS SYSTEM SUPPORTING UNLICENSED BAND

CROSS-REFERENCE TO RELATED APPLICATIONS

This application is the National Stage filing under 35 U.S.C. 371 of International Application No. PCT/KR2015/004054, filed on Apr. 23, 2015, which claims the benefit of U.S. Provisional Application No. 61/983,422, filed on Apr. 23, 2014, the contents of which are all hereby incorporated by reference herein in their entirety.

TECHNICAL FIELD

The present invention relates to a wireless access system supporting an unlicensed band, and to methods for transmitting and receiving data and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

The present invention relates to a wireless access system supporting an unlicensed band, and provides methods for transmitting and receiving data and devices for supporting the same.

One object of the present invention is to provide a method for efficiently transmitting and receiving data in a wireless access system supporting an unlicensed band and a licensed band.

Another object of the present invention is to provide a method for supporting an operation in an unlicensed band if two or more serving cells are aggregated in a carrier aggregation environment.

Still another object of the present invention is to provide various methods for defining a transmission opportunity (TxOP) period in an unlicensed band and configuring the TxOP period.

Further still another object of the present invention is to provide a method for allocating a TxOP period.

Further still another object of the present invention is to provide devices for supporting the methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The present invention relates to a wireless access system supporting an unlicensed band, and provides methods for transmitting and receiving data and devices for supporting the same.

In one aspect of the present invention, a method for transmitting and receiving data by means of a UE for a transmission opportunity (TxOP) period in a wireless access system supporting carrier aggregation (CA) with an unlicensed band comprises the steps of receiving a higher layer signal on a primary cell (Pcell), the higher layer signal including configuration information which indicates the size and use of the TxOP period; receiving a scheduling grant including scheduling information on the TxOP period at a first subframe of the TxOP period; and transmitting and receiving data in accordance with the use of the TxOP period on the basis of the scheduling information in a secondary cell (Scell) during the TxOP period, wherein the size of the TxOP period is defined by the number of subframes of the Scell and the use of the TxOP period is set for downlink data transmission or uplink data transmission, wherein whether the subframes of the Scell are included in the TxOP period is determined in accordance with a transmission direction of subframes of the Pcell corresponding to the subframes of the Scell.

In this case, the Pcell may be a serving cell configured in a licensed band, and the Scell may be a serving cell configured in the unlicensed band.

If the use of the TxOP period is for the downlink data transmission, subframes of the Scell, which correspond to a special subframe and an uplink subframe of the subframes of the Pcell, may not be counted as subframes included in the TxOP period.

At this time, a reservation signal may be received from the Scell at the subframes of the S cell, which correspond to the special subframe and the uplink subframe, to prevent another system from reserving a corresponding resource.

If the use of the TxOP period is for the downlink data transmission, and if a downlink control channel is transmitted or a downlink pilot time slot (DwPTS) period is used at the special subframe of the subframes of the Pcell, the subframe of the Scell, which corresponds to the special subframe, may be counted as the subframe included in the TxOP period.

The method may further comprise the step of receiving a higher layer signal, which includes one or more of position information indicating a position where the TxOP period starts and extension information indicating whether the TxOP period is extended, from the Pcell.

If a physical downlink control channel (PDCCH), which includes a carrier indication field (CIF) indicating the S cell and a position field indicating a start of the TxOP period, is received from the Pcell, the starting position of the TxOP period may be configured based on an index of a subframe, at which the PDCCH is received, and the position information.

If a physical downlink control channel (PDCCH), which includes a carrier indication field (CIF) indicating the S cell and an extension field indicating whether the TxOP period is extended, is received from the Pcell, the TxOP period may be reconfigured from a subframe configured based on an index of a subframe at which the PDCCH is received and the extension information.

In another aspect of the present invention, a UE for transmitting and receiving data for a transmission opportunity (TxOP) period in a wireless access system supporting carrier aggregation (CA) with an unlicensed band comprises a transmitter; a receiver; and a processor for controlling the transmitter and the receiver to support data transmission and reception for the TxOP period, wherein the processor is configured to receive a higher layer signal on a primary cell (Pcell), the higher layer signal including configuration information which indicates the size and use of the TxOP period by controlling the receiver, receive a scheduling grant including scheduling information on the TxOP period at a first subframe of the TxOP period by controlling the receiver, and transmit and receive data in accordance with the use of the TxOP period on the basis of the scheduling information in a secondary cell (Scell) during the TxOP period by controlling the transmitter or the receiver, and wherein the size of the TxOP period is defined by the number of subframes of the Scell and the use of the TxOP period is set for downlink data transmission or uplink data transmission, wherein whether the subframes of the Scell are included in the TxOP period is determined in accordance with a transmission direction of subframes of the Pcell corresponding to the subframes of the Scell.

At this time, the Pcell may be a serving cell configured in a licensed band, and the Scell may be a serving cell configured in the unlicensed band.

Also, if the use of the TxOP period is for the downlink data transmission, subframes of the Scell, which correspond to a special subframe and an uplink subframe of the subframes of the Pcell, may not be counted as subframes included in the TxOP period.

Also, a reservation signal may be received from the S cell at the subframes of the Scell, which correspond to the special subframe and the uplink subframe, to prevent another system from reserving a corresponding resource.

If the use of the TxOP period is for the downlink data transmission, and if a downlink control channel is transmitted or a downlink pilot time slot (DwPTS) period is used at the special subframe of the subframes of the Pcell, the subframe of the Scell, which corresponds to the special subframe, may be counted as the subframe included in the TxOP period.

In the above aspect of the present invention, the UE may further receive a higher layer signal, which includes one or more of position information indicating a position where the TxOP period starts and extension information indicating whether the TxOP period is extended, from the Pcell.

If a physical downlink control channel (PDCCH), which includes a carrier indication field (CIF) indicating the S cell and a position field indicating a start of the TxOP period, is received from the Pcell, the starting position of the TxOP period may be configured based on an index of a subframe, at which the PDCCH is received, and the position information.

If a physical downlink control channel (PDCCH), which includes a carrier indication field (CIF) indicating the S cell and an extension field indicating whether the TxOP period is extended, is received from the Pcell, the TxOP period may be reconfigured from a subframe configured based on an index of a subframe at which the PDCCH is received and the extension information.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First of all, data can efficiently be transmitted and received in a wireless access system supporting an unlicensed band and a licensed band.

Secondly, if two or more serving cells are aggregated in a carrier aggregation environment, an operation in an unlicensed band can be supported, whereby a data transmission rate can be improved.

Thirdly, various methods for defining a transmission opportunity (TxOP) period in an unlicensed band and configuring a TxOP period can be provided, whereby a data transmission rate in a licensed band and an unlicensed band can be performed more efficiently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

BEST MODE FOR CARRYING OUT THE INVENTION

Figure 1:
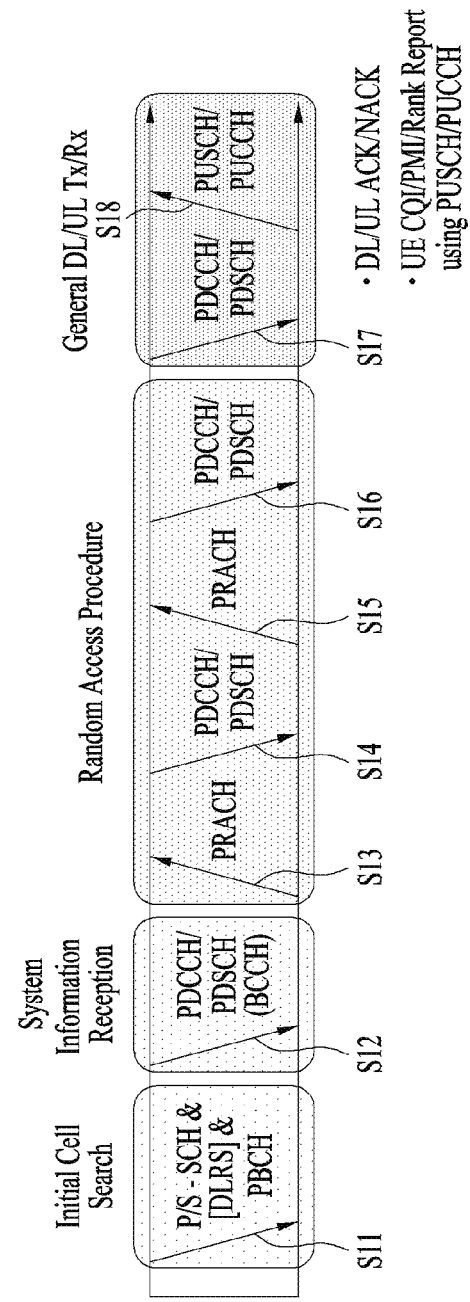
FIG. 1 is a conceptual diagram illustrating physical channels used in the embodiments and a signal transmission method using the physical channels.

The embodiments of the present invention, which will hereinafter be described in detail, relates to a wireless access system supporting an unlicensed band, and to methods for transmitting and receiving data and devices for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
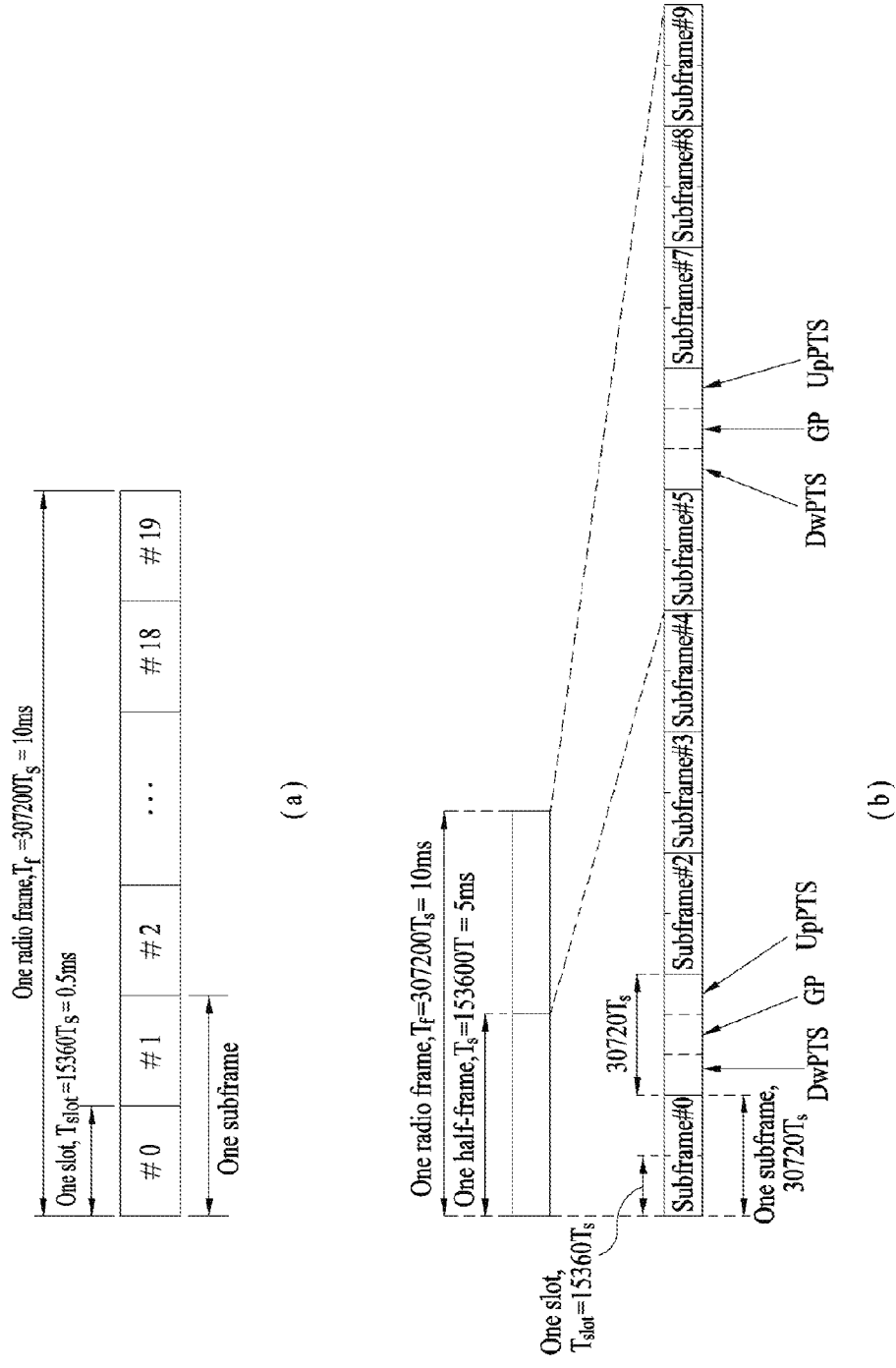
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 1-continued

| | | Normal cyclic prefix in downlink | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 3 | 24144·$T_s$ | | | 25600·$T_s$ | | |
| 4 | 26336·$T_s$ | | | 7680·$T_s$ | | |
| 5 | 6592·$T_s$ | 4384·$T_s$ | 5120·$T_s$ | 20480·$T_s$ | 4384·$T_s$ | 5120·$T_s$ |
| 6 | 19760·$T_s$ | | | 23040·$T_s$ | | |
| 7 | 21952·$T_s$ | | | — | — | — |
| 8 | 24144·$T_s$ | | | — | — | — |

Figure 3:
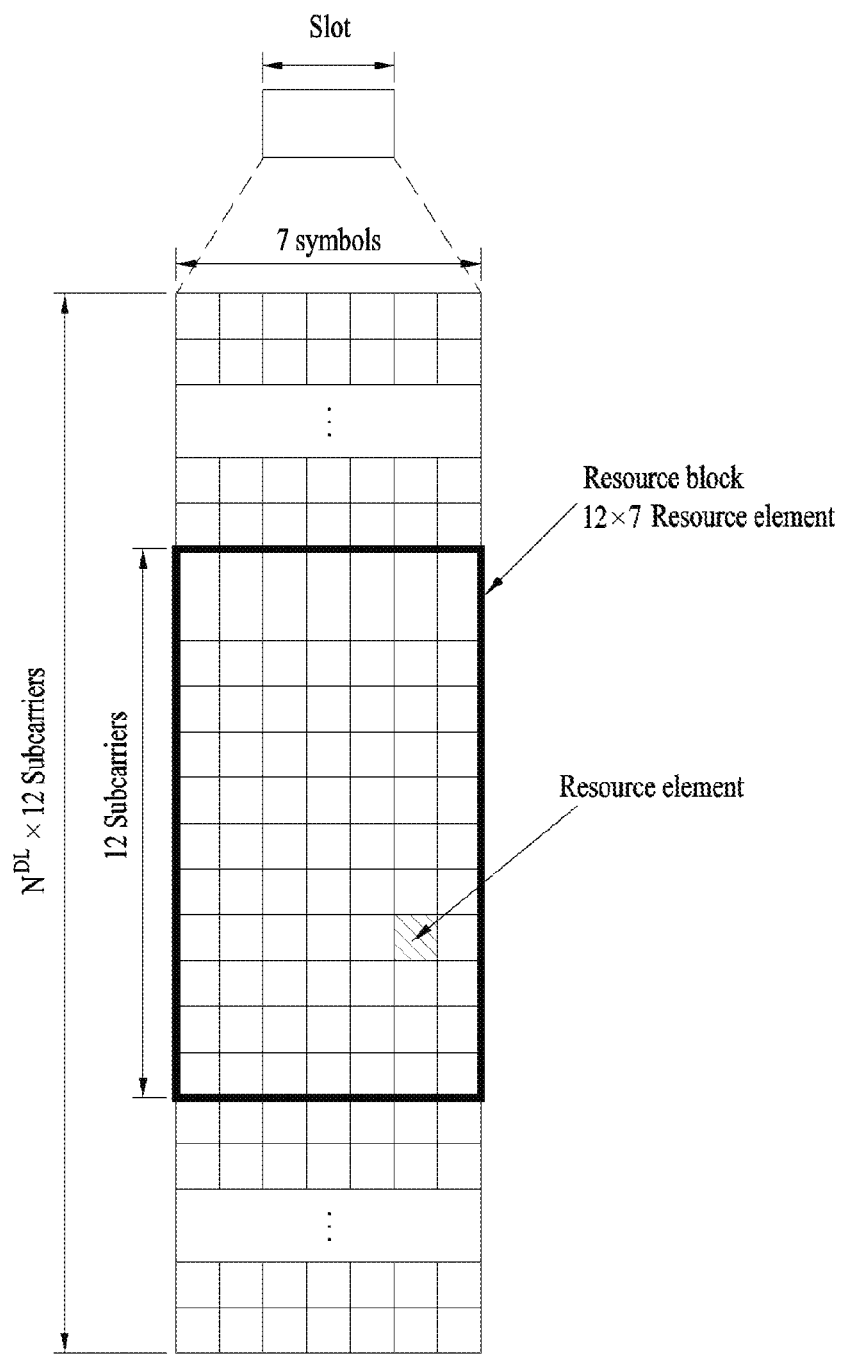
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
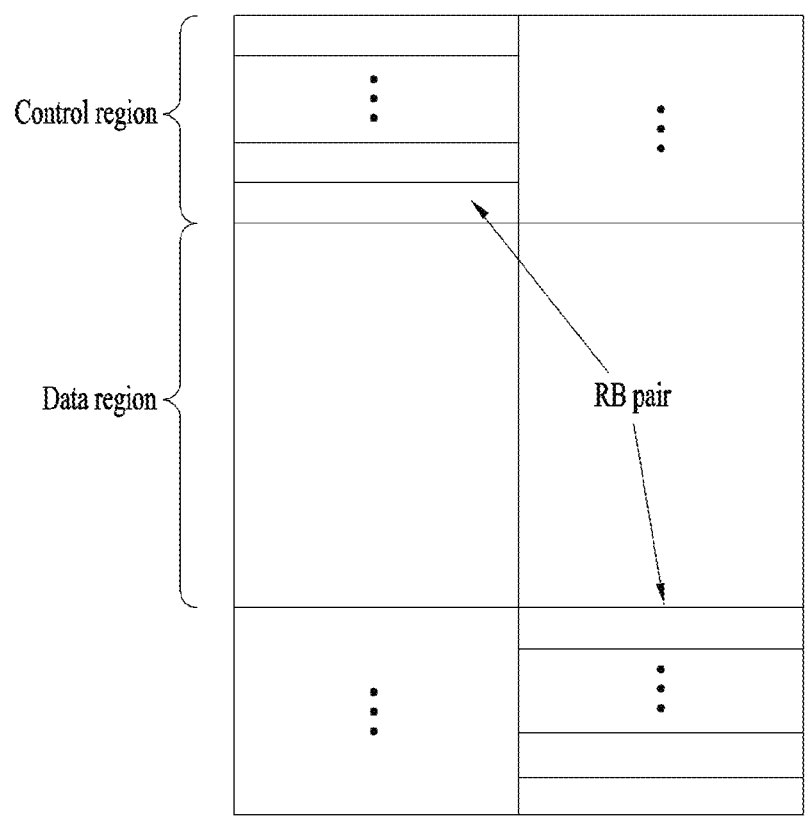
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
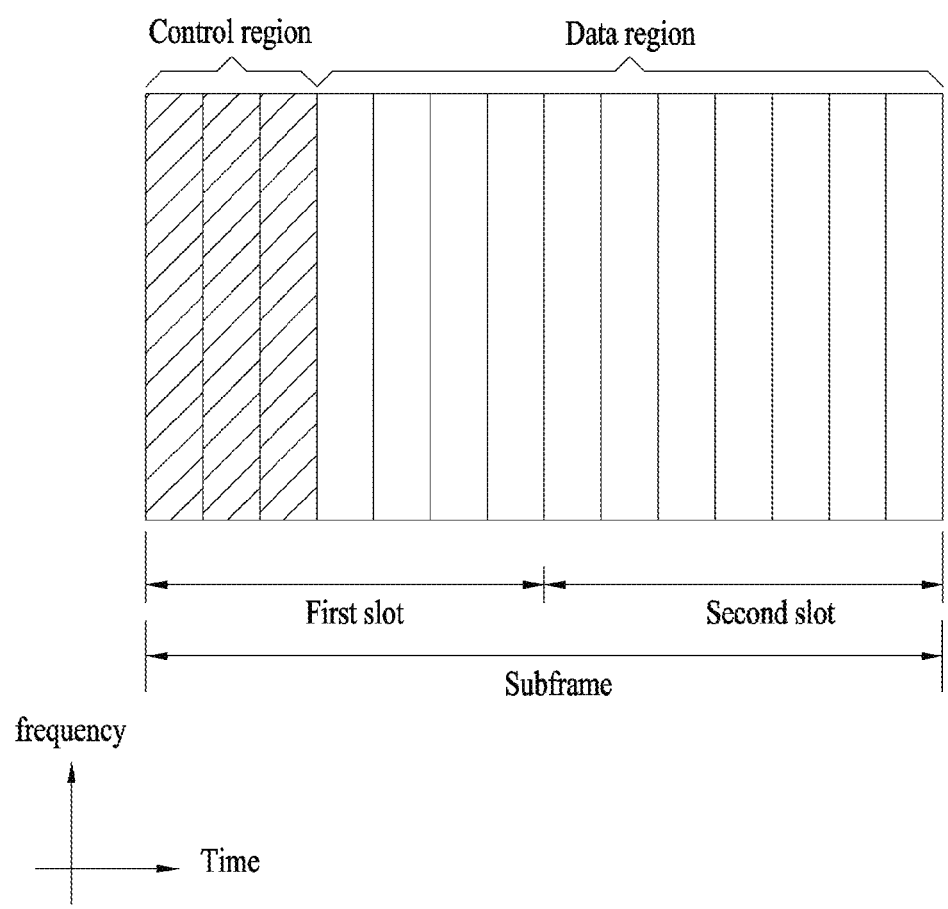
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels $\{4, 8\}$ and the USS supports PDCCHs with CCE aggregation levels $\{1, 2, 4, 8\}$. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment

2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA.

To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
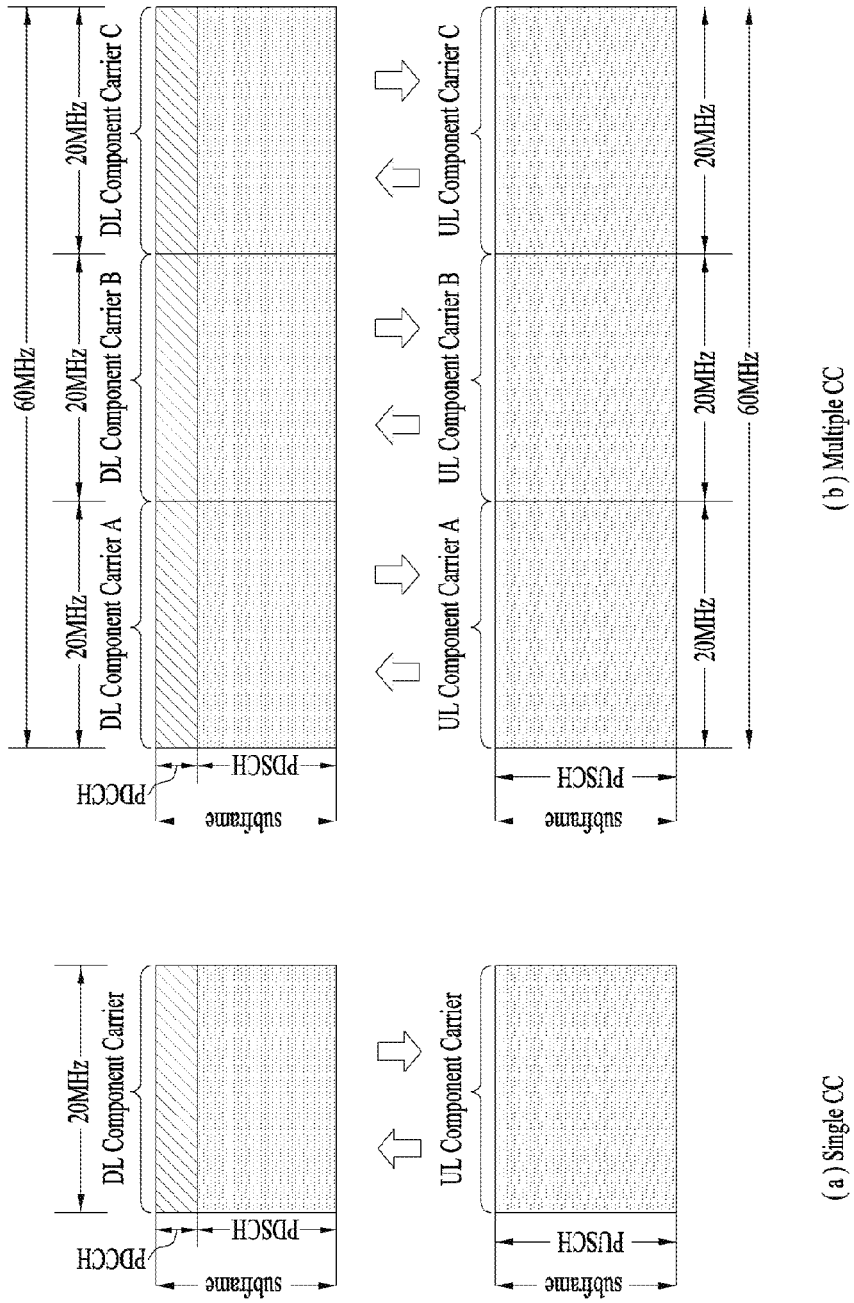
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6($a$) illustrates a single carrier structure in the LTE system. There are a DL CC and a UL CC and one CC may have a frequency range of 20 MHz.

FIG. 6($b$) illustrates a CA structure in the LTE-A system. In the illustrated case of FIG. 6($b$), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits or the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
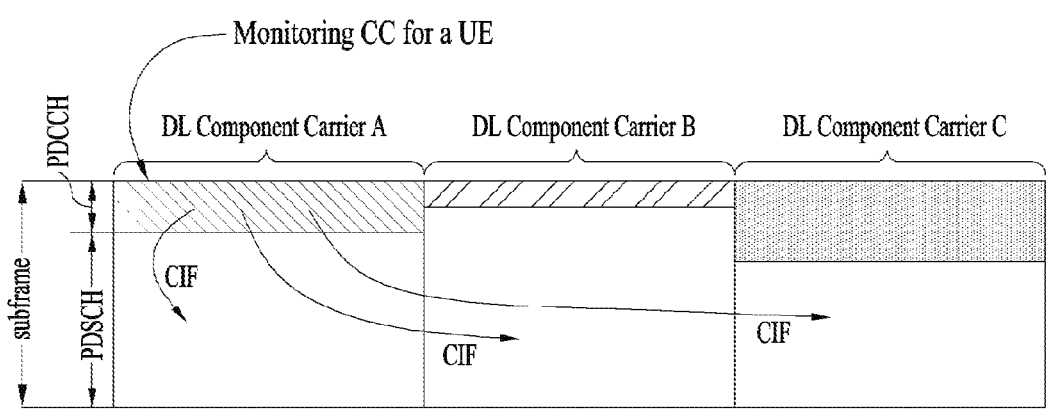
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
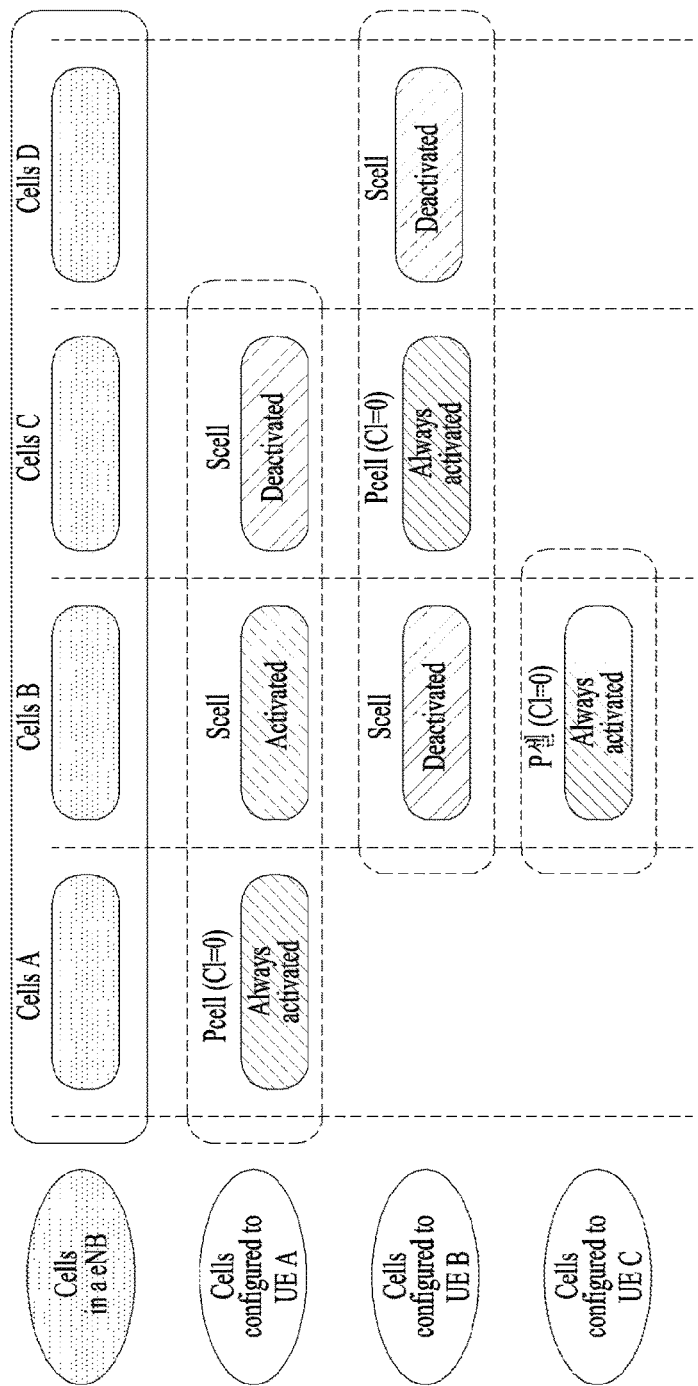
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

Hereinafter, reference signals that can be used in the embodiments of the present invention will be described.

Figure 10:
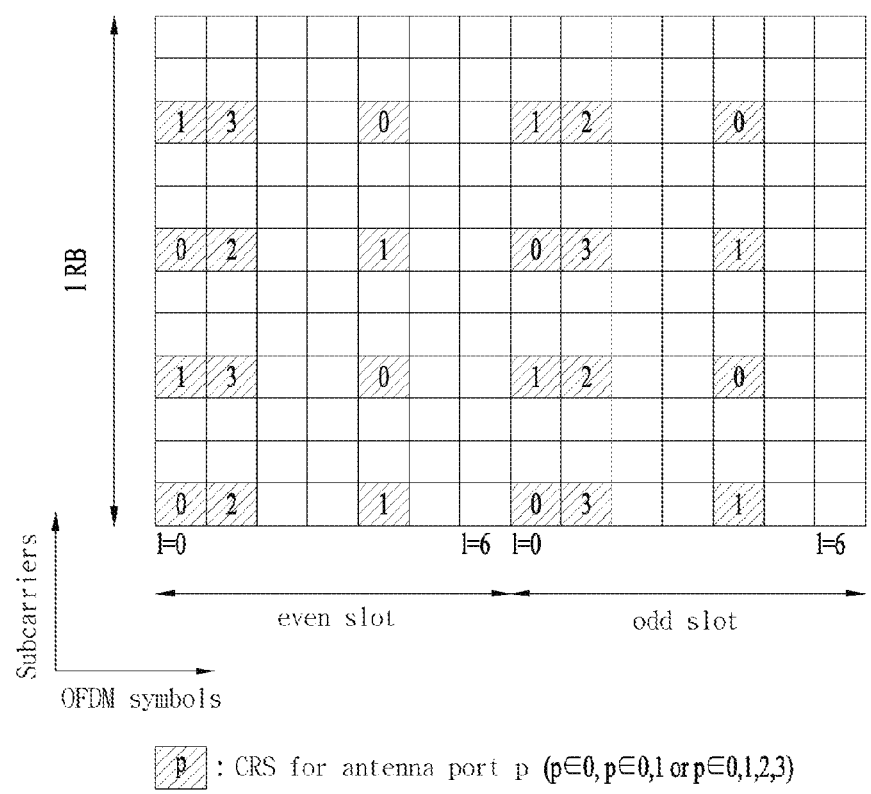
FIG. 10 illustrates an example of a subframe to which a cell specific reference signal (CRS) that can be used in the embodiments of the present invention is allocated.

FIG. 10 illustrates an example of a subframe to which a cell specific reference signal (CRS) that can be used in the embodiments of the present invention is allocated.

FIG. 10 illustrates an allocation structure of a CRS if four antennas are supported in a wireless access system. In a 3GPP LTE/LTE-A system, the CRS is used for decoding and channel state measurement. Therefore, the CRS is transmitted to all downlink bandwidths at all downlink subframes within a cell supporting PDSCH transmission, and is transmitted from all antenna ports configured in an eNB.

In more detail, CRS sequence is mapped to complex-valued modulation symbols used as reference symbols for an antenna port p at a slot $n_s$.

A UE may measure CSI by using the CRS, and may decode a downlink data signal received through a PDSCH at a subframe including the CRS, by using the CRS. That is, the eNB transmits the CRS from all RBs to a certain position within each RB, and the UE detects a PDSCH after performing channel estimation based on the CRS. For example, the UE measures a signal received at a CRS RE. The UE may detect a PDSCH signal from RE to which PDSCH is mapped, by using a ratio of receiving energy per CRS RE and a receiving energy per RE to which PDSCH is mapped.

As described above, if the PDSCH signal is transmitted based on the CRS, since the eNB should transmit the CRS to all RBs, unnecessary RS overhead is generated. To solve this problem, the 3GPP LTE-A system additionally defines UE-specific RS (hereinafter, UE-RS) and channel state information reference signal (CSI-RS) in addition to the CRS. The UE-RS is used for demodulation, and the CSI-RS is used to derive channel state information.

Since the UE-RS and the CRS are used for demodulation, they may be RSs for demodulation in view of use. That is, the UE-RS may be regarded as a kind of a demodulation reference signal (DM-RS). Also, since the CSI-RS and the CRS are used for channel measurement or channel estimation, they may be regarded as RSs for channel state measurement in view of use.

2.5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
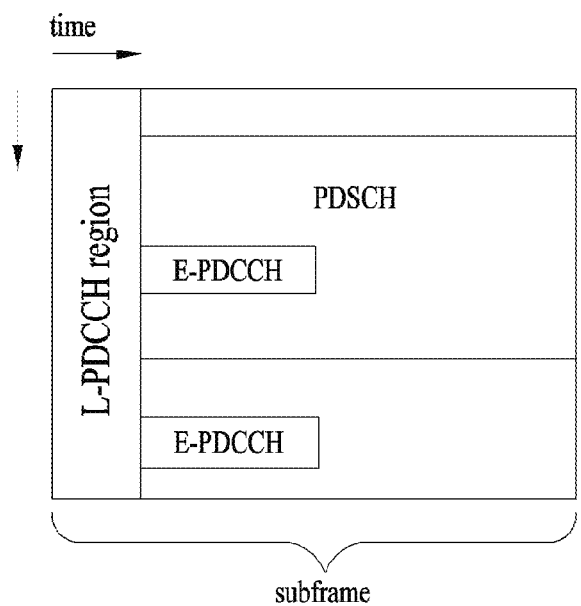
FIG. 11 illustrates an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a carrier aggregation environment of an LTE-A band corresponding to a licensed band and an unlicensed band will be described. In the embodiments of the present invention, an LTE-U system means an LTE system that supports such a CA status of a licensed band and an unlicensed band. A WiFi band or Bluetooth (BT) band may be used as the unlicensed band.

Figure 12:
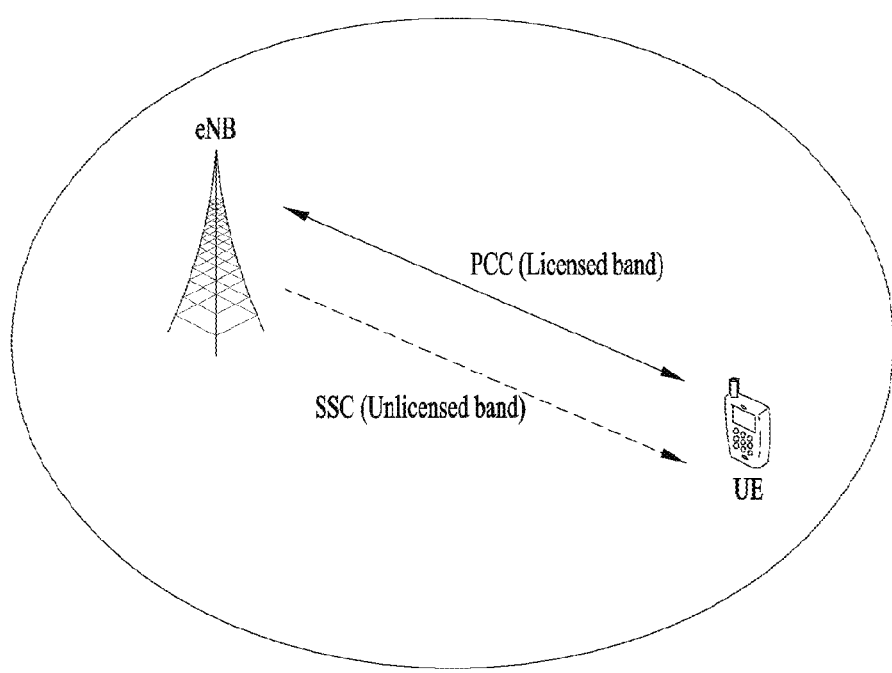
FIG. 12 illustrates an example of a CA environment supported in an LTE-U system.

FIG. 12 illustrates an example of a CA environment supported in an LTE-U system.

Hereinafter, for convenience of description, it is assumed that a UE is configured to perform wireless communication in each of a licensed band and an unlicensed band by using two component carriers (CCs). The methods which will be described hereinafter may be applied to even a case where three or more CCs are configured for a UE.

In the embodiments of the present invention, it is assumed that a carrier of the licensed band may be a primary CC (PCC or Pcell), and a carrier of the unlicensed band may be a secondary CC (SCC or Scell). However, the embodiments of the present invention may be applied to even a case where a plurality of licensed bands and a plurality of unlicensed bands are used in a carrier aggregation method. Also, the methods suggested in the present invention may be applied to even a 3GPP LTE system and another system.

In FIG. 12, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 12 is only example, and the embodiments of the present invention may be applied to even a CA environment that one UE accesses a plurality of eNBs.

For example, the UE may configure a macro eNB (M-eNB) and a Pcell, and may configure a small eNB (S-eNB) and an Scell. At this time, the macro eNB and the small eNB may be connected with each other through a backhaul network.

In the embodiments of the present invention, the unlicensed band may be operated in a contention-based random access method. At this time, the eNB that supports the unlicensed band may perform a carrier sensing (CS) procedure prior to data transmission and reception. The CS procedure determines whether a corresponding band is reserved by another entity.

For example, the eNB of the Scell checks whether a current channel is busy or idle. If it is determined that the corresponding band is idle state, the eNB may transmit a scheduling grant to the UE to allocate a resource through (E)PDCCH of the Pcell in case of a cross carrier scheduling mode and through PDCCH of the Scell in case of a self-scheduling mode, and may try data transmission and reception.

At this time, the eNB may configure a transmission opportunity (TxOP) period comprised of N consecutive subframes. In this case, a value of N and a use of the N subframes may previously be notified from the eNB to the UE through higher layer signaling through the Pcell or through a physical control channel or physical data channel.

3. 2 TxOP Period

An eNB may transmit and receive data to and from one UE for a TxOP period, and may configure a TxOP period comprised of N consecutive subframes for each of a plurality of UEs and transmit and receive data in accordance with TDM or FDM. At this time, the eNB may transmit and receive data through a Pcell which is a licensed band and an Scell which is an unlicensed band for the TxOP period.

However, if the eNB transmits data in accordance with a subframe boundary of an LTE-A system corresponding to a licensed band, a timing gap may exist between an idle determination timing of the S cell which is an unlicensed band and an actual data transmission timing. Particularly, since the Scell should be used as an unlicensed band, which cannot be used exclusively by a corresponding eNB and a corresponding UE, through CS based contention, another system may try information transmission for the timing gap.

Therefore, the eNB may transmit a reservation signal from the Scell to prevent another system from trying information transmission for the timing gap. In this case, the reservation signal means a kind of "dummy information" or "a copy of a part of PDSCH" transmitted to reserve a corresponding resource region of the S cell as a resource of the eNB. The reservation signal may be transmitted for the timing gap (i.e., from the idle determination timing of the S cell to the actual transmission timing).

According to the LTE-A specifications, subframe use and method of a UE of a half-duplex (HD) mode, which does not enable transmission and reception at the same time, on an Scell may be determined by a subframe direction of the Pcell as listed in Table 6 below.

TABLE 6

In case multiple cells with different uplink-downlink configurations are aggregated and the UE is not capable of simultaneous reception and transmission in the aggregated cells, the following constraints apply:
    if the subframe in the primary cell is a downlink subframe, the UE shall not transmit any signal or channel on a secondary cell in the same subframe
    if the subframe in the primary cell is an uplink subframe, the UE is not expected to receive any downlink transmissions on a secondary cell in the same subframe
    if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

Referring to Table 6, a UE at a DL sufbrame of the Pcell cannot transmit data to the Scell, and a UE at a UL subframe of the Pcell cannot receive data from the Scell. Also, if the subframe of the Pcell is a special subframe, the UE cannot receive PDSCH transmission through the Scell and cannot receive data for a guard period and a UpPTS period. Description of the special subframe may be understood with reference to the description of FIG. 2(b).

In the embodiments of the present invention, a size of the TxOP period may be defined by the number of consecutive subframes of the Scell. At this time, a use of the TxOP period is configured for downlink data transmission or uplink data transmission, and whether the subframe of the S cell is included in the TxOP period may be determined in accordance with a transmission direction (see Table 6) of the subframe of the Pcell corresponding to the subframe of the Scell.

In the embodiments of the present invention, the UE may measure a channel state through a reference signal (for example, CRS) for the TxOP period or transmit and receive data or receive a control channel such as (E)PDCCH. Also, the UE may assume that the corresponding Scell is deactivated virtually for a period that TxOP is not configured.

Also, in the embodiments of the present invention, the 'UE' means a UE of 'HD' mode unless specifically described.

3. 3 Method for Configuring TxOP Period

Figure 13:
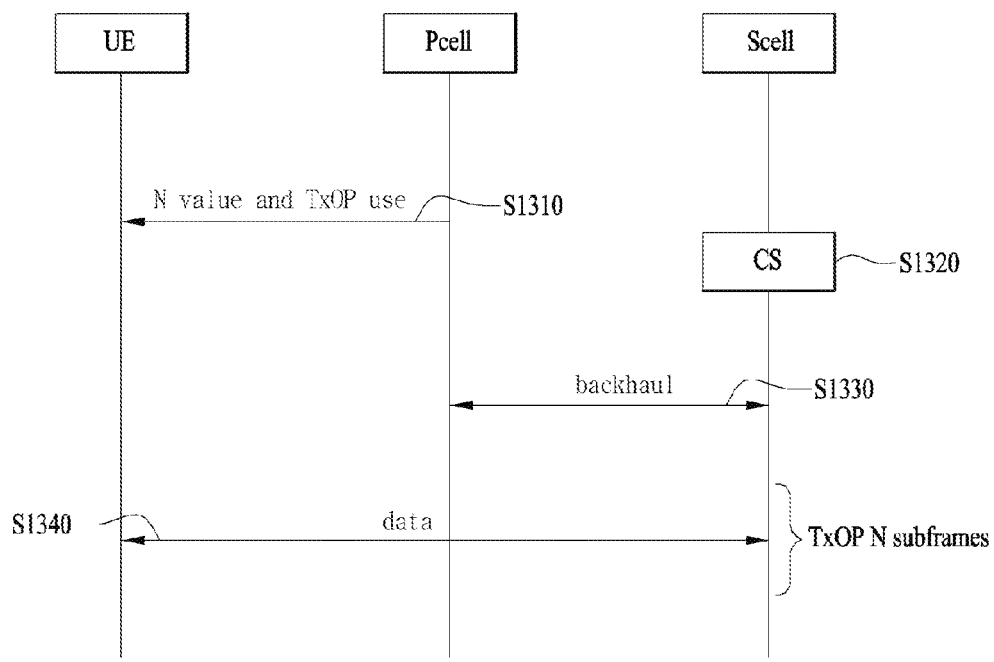
FIG. 13 illustrates one of methods for configuring a TxOP period.

FIG. 13 illustrates one of methods for configuring a TxOP period.

An eNB may previously configure a TxOP period semi-statically through a Pcell. For example, the eNB may transmit a value of N corresponding to the number of subframes constituting the TxOP period and configuration information on a use of the corresponding TxOP period to a UE through a higher layer signal (for example, RRC signal) (S1310).

However, the step S1310 may be performed dynamically in accordance with system configuration. In this case, the eNB may transmit configuration information on the TxOP period to the UE through a PDCCH or E-PDCCH.

The Scell may perform a carrier sensing (CS) procedure to check whether a current channel state is an idle state or a busy state (S1320).

The Pcell and the Scell may be managed by their respective eNBs different from each other or the same eNB. However, if the Pcell and the Scell are managed by different base stations, information on a channel state of the Scell may be delivered to the Pcell through a backhaul (S1330).

Afterwards, at a subframe configured as the TxOP period, the UE may transmit and receive data through the Pcell and the Scell. If the use of the corresponding TxOP is configured for downlink data transmission at the step S1310, the UE may receive DL data through the Scell for the TxOP period, and if the use of the corresponding TxOP is configured for uplink data transmission at the step S1310, the UE may transmit UL data through the Scell (S1340).

Figure 14:
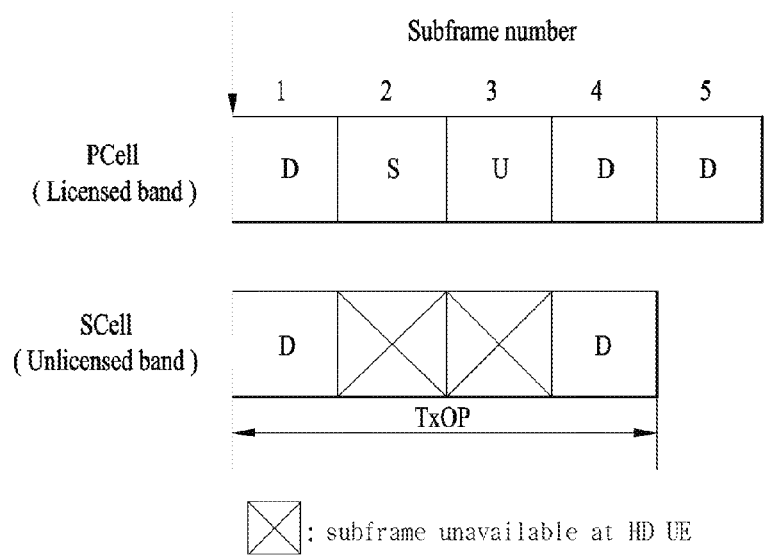
FIG. 14 illustrates an example of configuring a TxOP period.

FIG. 14 illustrates an example of configuring a TxOP period.

Referring to FIG. 14, if the Pcell is a licensed band and the Scell is an unlicensed band, a size N of the TxOP period may be set to 4. At this time, a subframe structure of the Pcell and the Scell may be set to a frame structure type 2 according to a TDD system (see FIG. 2(b)). Hereinafter, in the drawings for illustrating the embodiments of the present invention, 'D' means a downlink subframe, 'U' means an uplink subframe, 'S' means a special subframe, and 'X' means a subframe that cannot be used by an half-duplex user equipment (HD UE).

In FIG. 14, the eNB may previously designate a starting point of the TxOP period as number 1 subframe through higher layer signaling or physical control/data channel, set a size N of the TxOP period to 4 and configure the use of the TxOP as DL data transmission. At this time, since the size of the TxOP period is set to 4, the UE should use subframes number 1 to number 4 of the Scell as the TxOP period. However, since the subframe number 2 of the Pcell is a special subframe and the subframe number 3 is a UL subframe, the UE cannot receive data through the subframes number 2 and number 3 of the Scell in accordance with a rule described in Table 6.

For this reason, a problem may occur in that the actual TxOP period for transmitting DL data to the UE may be smaller than 4 subframes. Therefore, the embodiments of the present invention, which will be described hereinafter, suggest methods for supporting a TxOP period, which can assure a total number N of subframes that may be used on the Scell by the UE.

4. Method for Transmitting and Receiving Data at TxOP Period

In the embodiments of the present invention, the operation of the Scell will mainly be described to more efficiently describe the operation on the LTE-U system. The Pcell may transmit and receive data and control information in DL and UL directions in accordance with the frame structure configured as shown in FIG. 14. At a special subframe, the operation of the UE and/or the eNB may be performed as described with reference to FIG. 2(b). That is, although the operation in the Scell will mainly be described in the drawings described hereinafter, the operation of the eNB and/or the UE in the Pcell may be performed in accordance with the subframe configuration of the Pcell.

Hereinafter, methods for configuring a TxOP period and methods for designating a TxOP period will be described in detail.

4. 1 Method for Counting TxOP Period

If a random subframe within a TxOP period allocated to a UE cannot be used for a use which is previously defined, the UE may not count the corresponding subframe as the TxOP period.

Figure 15:
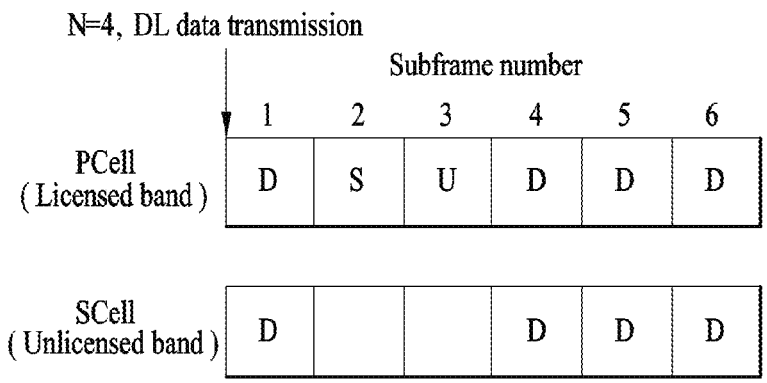
FIG. 15 illustrates another example of configuring a TxOP period.

FIG. 15 illustrates another example of configuring a TxOP period.

In FIG. 15, it is assumed that the number N of TxOP periods is 4 and a use of the TxOP period is configured for DL data transmission. Subframes number 2 and number 3 of the Pcell within the TxOP period of which use is defined for DL data transmission are respectively 'S' and 'U' subframes. Therefore, the UE cannot receive DL data through the Scell. In this case, the UE does not count the corresponding subframes as the TxOP period.

Therefore, referring to FIG. 15, since the UE does not recognize the subframes number 2 and number 3 as the TxOP period, the TxOP period actually allocated to the UE includes subframes up to number 6. As a result, the UE can be assured of 4 subframes corresponding to a total number N of subframes.

In one aspect of the present invention, the Scell can transmit a kind of reservation signal for subframes, which cannot be used for a previously defined use, among subframes within the TxOP period allocated to the UE.

In FIG. 15, since a DL data transmission for an HD UE cannot be performed at the subframes number 2 and 3, the Scell does not transmit downlink data to the UE for the corresponding subframes. However, another system of an unlicensed band may try data transmission at a period (that is, subframes number 2 and number 3 of FIG. 15) that the Scell does not transmit data in view of features of a contention based unlicensed band operation. To previously avoid this, the Scell may transmit a reservation signal at the subframes number 2 and number 3 of FIG. 15 to prevent another system from reserving the corresponding resource.

Alternatively, in another aspect of the present invention, the eNB may be configured to perform data transmission by allocating corresponding subframes to a full-duplex (FD) UE, which enable simultaneous transmission and reception, for a period that the Scell does not transmit data.

4. 2 Method for Configuring TxOP Period Semi-Statically

Hereinafter, methods for semi-statically configuring subframes included in one TxOP period will be described. For example, subframes included in one TxOP period may be configured semi-statically by the same scheduling information. In more detail, scheduling information such as MCS level or RB region allocated through an initial scheduling grant included in a PDCCH can be used continuously within the TxOP period. That is, the eNB can schedule the TxOP period similarly to semi-persistent scheduling (SPS).

For example, referring to FIG. 15, if the eNB allocates MCS level and/or RB region through the initial scheduling grant at subframe number 1, the eNB may not transmit additional control information (that is, scheduling grant) at subframes number 4 to 6 included in the same TxOP period. At this time, the UE may continuously use scheduling information, which is received at the subframe number 1, at subframes number 4 to number 6.

At this time, the scheduling grant may be scheduling information transmitted through the Pcell in case of a cross carrier scheduling (CCS) mode and transmitted through the Scell in case of a self-carrier scheduling (SCS) mode.

In another aspect of the present invention, the eNB may change scheduling information, which is configured semi-statically, in accordance with a channel state. For example, in the middle of the TxOP period (e.g., subframe number 5 of FIG. 15), the eNB may reconfigure MCS level or RB region of the corresponding TxOP period by transmitting additional scheduling grant. That is, if serious interference occurs at the subframe within the TxOP period or RB region, the eNB may reduce MCS level by transmitting additional scheduling grant or reduce damage caused by interference by reconfiguring RB region having high interference. On the contrary, if a channel state of a previously allocated subframe or RB region becomes significantly good, the eNB may increase a transmission rate by increasing MCS level through additional scheduling grant.

This method may be applied to the FD UE as well as the HD UE.

In still another aspect of the present invention, in case of subframe which does not need additional DL scheduling grant within the TxOP period of which use is defined for DL data transmission, the Scell may use a PDCCH region, to which a DL scheduling grant is transmitted, for PDSCH transmission. That is, if scheduling grant is not required, the eNB of the Scell may use a resource efficiently by using the PDCCH region for DL data transmission.

For example, if additional DL scheduling grant transmission through the Scell is not required at the subframe number 4 of FIG. 15, the Scell may use the PDCCH region for DL data transmission. This method may be configured to be restrictively applied to the case where a DL scheduling operation of the Scell is operated by CCS or the case where the DL scheduling operation of the Scell is operated by self-scheduling and a scheduling grant is transmitted semi-statically.

This embodiment of the present invention may be applied to FD UE as well as HD UE.

Figure 16:
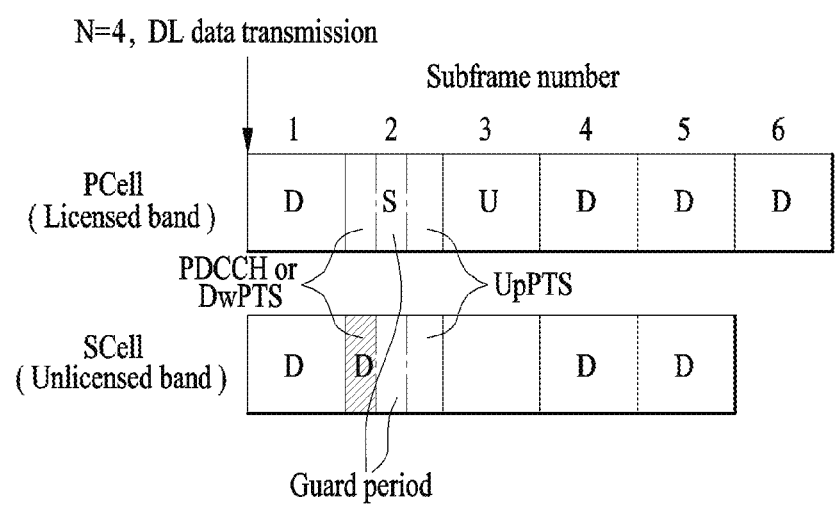
FIG. 16 illustrates still another example of configuring a TxOP period.

FIG. 16 illustrates still another example of configuring a TxOP period.

Among subframes within the TxOP period allocated to the UE, a special subframe exists in the Pcell, and a subframe region of the S cell corresponding to a DwPTS period of the special subframe of the Pcell or a PDCCH period within the special subframe of the Pcell may be used as a PDSCH for DL data transmission. In this case, the UE can count the corresponding subframe as the TxOP period.

For example, since the subframe number 2 is configured as the special subframe of the Pcell in FIG. 16, according to the method suggested in section 4.1, the UE does not count the subframe number 2 as the TxOP period. However, if the subframe region of the Scell corresponding to a DwPTS region or PDCCH region of the subframe number 2 of the Pcell is used as a PDSCH, the UE may be configured to count the subframe number 2 as the TxOP period. Therefore, the UE may recognize the TxOP period up to subframe number 5 as shown in FIG. 16.

4. 3 Method for Designating TxOP Period

Hereinafter, as one method that the eNB explicitly indicates a starting point (that is, subframe #n) of the TxOP period, methods for transmitting a PDCCH at subframe #n or subframe #(n-k) will be suggested.

For example, in FIG. 16, the eNB may notify the UE that the TxOP period starts from subframe number 1, at the subframe number 1 and the (1-k)th subframe of the Pcell through PDCCH. If the PDCCH is transmitted at the (1-k) th subframe, a value of k may previously be notified from the eNB to the UE through higher layer signaling or a physical control/data channel.

4. 3. 1 Method for Using CIF

If a CIF included in the scheduling grant transmitted through PDCCH indicates a carrier of the S cell, a UE may be notified implicitly that TxOP starts after subframe at which the PDCCH is transmitted or k number of subframes.

4. 3. 2 Method for Using Additional Bits

Hereinafter, if a CIF of a DCI format indicates an Scell constituting TxOP, a method for explicitly notifying from an eNB to a UE that a TxOP period starts after a corresponding subframe or k number of subframes will be described.

For example, the eNB may transmit a DCI format, which includes a position bit for indicating a position where the TxOP period starts, to the UE. If the position bit is 1 bit and is set to '1', it indicates that the TxOP period starts after a subframe at which a corresponding PDCCH is transmitted or k number of subframes. Also, if the position bit is set to '0', a size of the TxOP period may be set to a specific value (e.g., N=1) which is previously defined. At this time, the eNB and the UE may transmit and receive data within the TxOP period based on a specific value N after the subframe at which the corresponding PDCCH is transmitted or k number of subframes. At this time, the value of k may previously be notified from the eNB to the UE through higher layer signaling (through Pcell) or a physical control/data channel.

In another aspect of the present invention, the DCI format may further include an extension bit indicating whether the TxOP period is extended.

For example, if the extension bit has a size of 1 bit and is set to '1', the extension bit indicates that the TxOP period is extended at a current subframe #n or subframe #(n+j). At this time, extension of the TxOP period means that the TxOP period is repeated once more as much as the size N of the TxOP period which is previously set. If the extension bit is set to '0', MCS level or RB region can be reconfigured in the same manner as section 4.2 without extension of the TxOP period. At this time, the value of j may previously be notified from the eNB to the UE through higher layer signaling (through Pcell) or a physical control/data channel.

Figure 17:
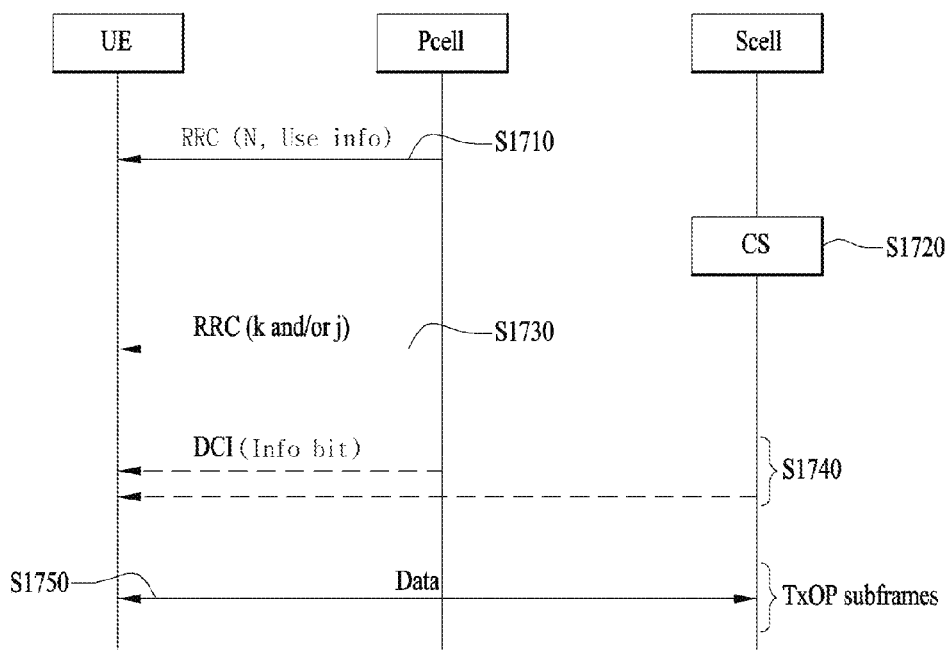
FIG. 17 illustrates a method for designating a starting position of a TxOP period described in section 4.3.

FIG. 17 illustrates a method for designating a TxOP period described in section 4.3.

In FIG. 17, the Pcell and the Scell may be contiguous carriers or non-contiguous carriers. Also, the Pcell and the Scell may be serving cells managed from the same eNB or managed from their respective eNBs located at their respective positions different from each other. It is assumed that the Pcell and the Scell configure a CA environment for one UE. At this time, the UE may be an HD UE or a FD UE.

In FIG. 17, the eNB may transmit a higher layer signal, which includes TxOP configuration information for previously designating a size N and a use of the TxOP period, PDCCH or E-PDCCH to the UE through the Pcell (S1710).

The Scell may perform a carrier sensing (CS) procedure to check whether the TxOP period is currently a busy state or an idle state (S1720).

The Pcell and the Scell may transmit and receive the result of the CS procedure and system information through a backhaul network (not shown). However, if the Pcell and the Scell are managed by one eNB, this procedure is not required.

The eNB may transmit a higher layer signal, a PDCCH or an E-PDCCH to the UE, which includes position information (k) indicating a starting position where the TxOP period starts and/or extension information (j) indicating whether the TxOP period is extended or not, (S1730).

The step S1730 is optional and may not be performed in accordance with the status. If the step S1730 is not performed, the position information (k) and/or the extension information (j) may be transmitted together with the TxOP configuration information at the step S1710. Alternatively, the position information (k) and the extension information (j) may not be used.

In one aspect of this embodiment, the embodiment that the position information (k) and/or the extension information (j) are configured in the UE will be described.

Referring to FIG. 17, the UE may decode a PDCCH, which includes a CIF indicating the Scell constituting TxOP (S1740).

At this time, if the position bit for indicating a start of the TxOP period in DCI is set to '1', the UE may identify that TxOP starts after k subframe indicated by the position information. Also, if the extension bit for indicating whether the TxOP period is extended in DCI is set to '1', the UE may identify that TxOP starting after the k subframe is more extended. Therefore, the UE may transmit and receive data to and from the eNB through the Scell within the TxOP period on the basis of the information acquired at the steps S1710 and S1730.

In another aspect of the present invention, the case that the position information and the extension information are not configured will be described.

This case corresponds to the case that the step S1730 is not performed. At this time, referring to FIG. 17, since the UE cannot know the TxOP period explicitly because the position information and the extension information are not configured. However, if a scheduling grant (that is, DCI) which includes a CIF indicating the Scell constituting the TxOP is received, the UE may recognize that the TxOP starts at the corresponding subframe (S1740).

Therefore, the UE may transmit and receive data on the S cell in accordance with a TxOP use configured for the TxOP period (S1750).

In FIG. 17, the step S1740 may be performed through the Pcell if the Pcell and the Scell are scheduled by a cross carrier scheduling mode, and may be performed in each of the Pcell and the Scell if the Pcell and the Scell are scheduled by a self-scheduling mode. Also, the aforementioned section 3 and/or 4 may be applied to the methods described in FIG. 17.

Figure 18:
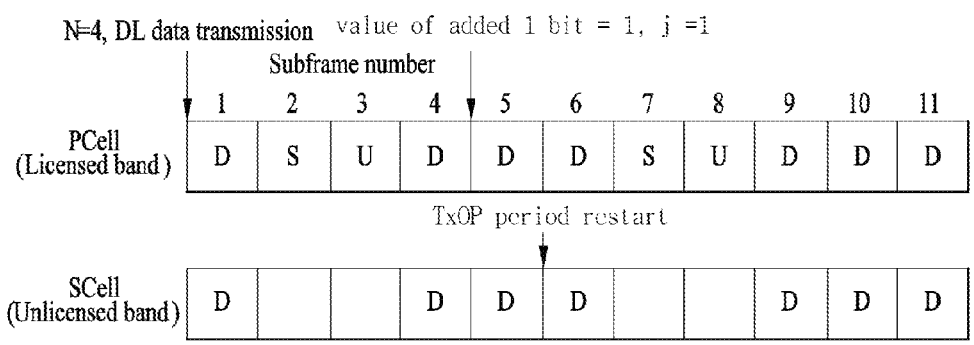
FIG. 18 illustrates another one of methods for configuring a TxOP period.

FIG. 18 illustrates another one of methods for configuring a TxOP period.

In FIG. 18, it is assumed that a size N of the TxOP period is 4 through RRC signaling and a use of the TxOP period is configured for DL data transmission. That is, the first TxOP period may be set up to subframe number 6. At this time, it is assumed that the CIF included in the DCI format of the subframe number 5 of the Pcell indicates index of the Scell, the extension bit included in the DCI format is set to 1 and extension information is set to j=1.

In this case, the TxOP period restarts from subframe number 6 in accordance with configuration of the extension bit of the DCI format received from subframe number 5 and extension information (j) which is previously configured even before the TxOP period which is first allocated ends. As a result, the TxOP period may be extended up to subframe number 11.

The aforementioned methods described in FIG. 17 and FIG. 18 may be applied to FD UE as well as HD UE.

Also, the case that a use of the TxOP period is for downlink data transmission has been described in the aforementioned embodiments of the present invention. This method may equally be applied to a case that a use of the TxOP period is for uplink data transmission.

The method of FIG. 17 may be applied to a method for semi-statically configuring the TxOP period described in section 4.2. For example, if DCI (that is, scheduling grant) is transmitted at the first subframe of the TxOP period at the step S1740, the UE may transmit and receive data by using the same scheduling information (for example, resource allocation information for MCS level and RB region) for the corresponding TxOP period at the step S1750. That is, if DCI is not transmitted at next subframes, the UE may reuse DCI received at the first subframe. Also, if scheduling information (for example, MCS level and/or RB region) needs to be changed within the TxOP period, the eNB may transmit DCI (that is, scheduling grant), which includes the changed scheduling information, through the Scell during self-carrier scheduling and through the Pcell during cross carrier scheduling.

4.4 Method for Configuring Other TxOP Period

Hereinafter, the embodiments which will be described hereinafter relate to methods for transmitting DL data even at a subframe of an S cell corresponding to an uplink subframe of a Pcell.

For example, when the UL subframe of the Pcell is included in subframes configured for DL data transmission within a TxOP period of an HD UE unlike the embodiment of the section 4.2, the Scell may transmit DL data for the corresponding subframe. In more detail, the HD UE may be configured to transmit only a specific signal, which is previously defined, at the UL subframe (i.e., see FIG. 14, subframe number 3) of the Pcell. In this case, a rule may be defined such that the subframe of the Scell corresponding to the UL subframe of the corresponding Pcell is used for DL data transmission. At this time, the specific signal may be defined as SRS and/or specific UCI (e.g., SR, UL ACK/NACK, periodic CQI, etc.) which is previously defined, and this information may be notified from the eNB to the UE through a signal which is previously defined.

Figure 19:
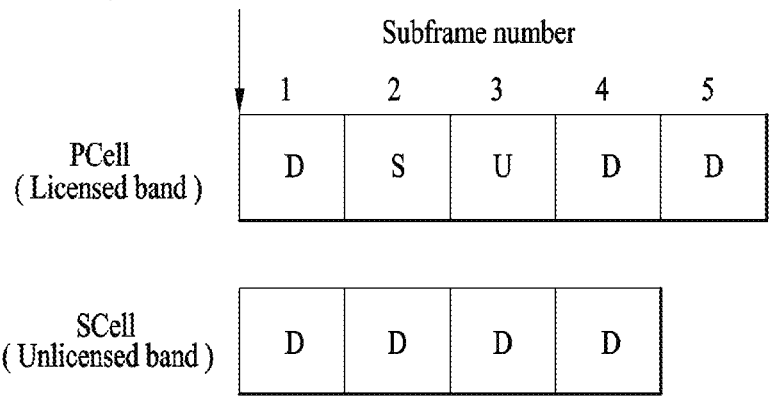
FIG. 19 illustrates still another one of methods for configuring a TxOP period.

In another aspect of the present invention, if a special subframe of the Pcell is included in the subframes configured for DL data transmission within the TxOP period, the S cell may transmit DL data for a guard period and UpPTS period of the corresponding subframe. For example, the guard period and UpPTS period as well as a PDCCH region (or DwPTS region) of subframe number 2 of the Pcell in FIG. 14 may be used as a PDSCH. If the subframe number 2 configured as the special subframe of the Pcell and the subframe number 3 configured as the UL subframe of the Pcell are used for PDSCH transmission, the TxOP period of FIG. 14 may be configured as shown in FIG. 19. FIG. 19 illustrates still another one of methods for configuring a TxOP period. The TxOP period of FIG. 19 may be configured as the TxOP period for 4 subframes corresponding to the TxOP period configured originally by the eNB for the UE FIG. 20 illustrates further still another one of methods for configuring a TxOP period.

Figure 20:
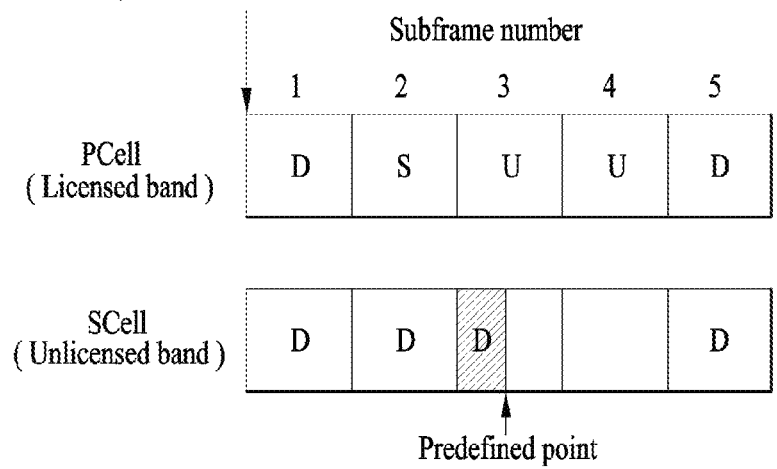
FIG. 20 illustrates further still another one of methods for configuring a TxOP period.

As shown in FIG. 20, when the method of the section 4.4 is used, the Scell may transmit DL data at the subframe number 3. At this time, if the HD UE performs UL scheduling of the Pcell at the subframe number 4, the eNB may transmit DL data to the UE at the subframe number 3 through the Scell by considering timing advance (TA).

Referring to FIG. 20, the eNB may transmit DL data to the UE after performing puncturing or rate-matching from a predefined point to the last OFDM symbol of the corresponding subframe through the S cell. At this time, the predefined point may be notified to the UE through higher layer signaling or physical control/data channel. Also, the predefined point may be varied depending on a TA value.

In another aspect of this embodiment, the eNB may be configured to be operated like the case where the subframe number 3 of the Pcell is a special subframe in the same manner as the embodiment described in FIG. 16. That is, the eNB may transmit DL data at the subframe number 3 of the Scell for the DwPTS period only.

5. Apparatuses

Figure 21:
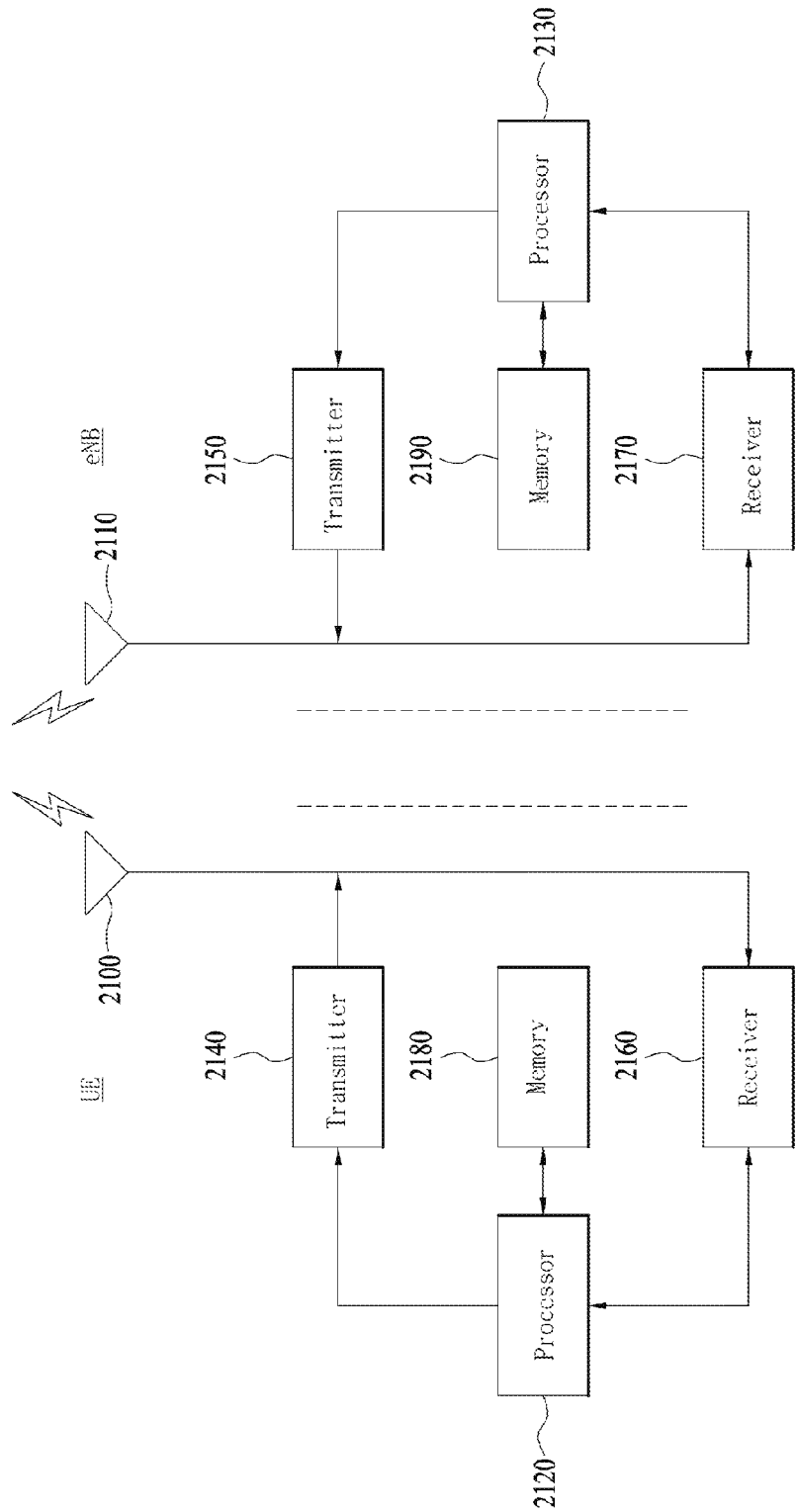
FIG. 21 illustrates a device through which methods described in FIGS. 1 to 20 can be implemented.

Apparatuses illustrated in FIG. 21 are means that can implement the methods described before with reference to FIGS. 1 to 20.

A UE may act as a transmitter on a UL and as a receiver on a DL. An eNB may act as a receiver on a UL and as a transmitter on a DL.

That is, each of the UE and the eNB may include a Transmitter (Tx) 2140 or 2150 and a Receiver (Rx) 2160 or 2170, for controlling transmission and reception of information, data, and/or messages, and an antenna 2100 or 2110 for transmitting and receiving information, data, and/or messages.

Each of the UE and the eNB may further include a processor 2120 or 2130 for implementing the afore-described embodiments of the present disclosure and a memory 2180 or 2190 for temporarily or permanently storing operations of the processor 2120 or 2130.

The embodiments of the present invention may be performed using the aforementioned components and functions of the UE and eNB. For example, the processor of the eNB may configure a TxOP period and transmit configuration information on the TxOP period to the UE by combination of the methods disclosed in the aforementioned sections 1 to 4. Also, the processor of the eNB may control the transmitter and receiver to support the operation of the TxOP period. The processor of the UE may support the operation of the TxOP period on the basis of the configuration information on the TxOP period, which is received from the eNB. At this time, the processor of the UE may support the TxOP operation by controlling the transmitter and the receiver. The detailed operation will be understood with reference to the section 3 and the section 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2180 or 2190 and executed by the processor 2120 or 2130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for transmitting and receiving data during a transmission opportunity (TxOP) period in a wireless access system supporting carrier aggregation (CA) with an unlicensed band, the method performed by a user equipment (UE) and comprising:
receiving a higher layer signal on a primary cell (Pcell), the higher layer signal including configuration information which indicates a size and a use of the TxOP period;
receiving a scheduling grant including scheduling information on the TxOP period at a first subframe of the TxOP period; and
transmitting and receiving data in accordance with the use of the TxOP period on the basis of the scheduling information in a secondary cell (Scell) during the TxOP period,
wherein the size of the TxOP period is defined by a number of subframes of the Scell and the use of the TxOP period is set for downlink data transmission or uplink data transmission, wherein whether the subframes of the Scell are included in the TxOP period is determined in accordance with a transmission direction of subframes of the Pcell corresponding to the subframes of the Scell, and
wherein the Pcell is a serving cell configured in a licensed band, and the Scell is a serving cell configured in the unlicensed band.

2. The method according to claim 1, wherein if the use of the TxOP period is for the downlink data transmission, subframes of the Scell, which correspond to a special subframe and an uplink subframe of the subframes of the Pcell, are not counted as subframes included in the TxOP period.

3. The method according to claim 2, wherein a reservation signal is received at the subframes of the S cell, which correspond to the special subframe and the uplink subframe.

4. The method according to claim 1, wherein if the use of the TxOP period is for the downlink data transmission, and if a downlink control channel is transmitted or a downlink pilot time slot (DwPTS) period is used at a special subframe of the subframes of the Pcell, the subframe of the Scell, which corresponds to the special subframe, is counted as a subframe included in the TxOP period.

5. The method according to claim 1, further comprising:
receiving a higher layer signal, which includes one or more of position information indicating a position where the TxOP period starts and extension information indicating whether the TxOP period is extended, from the Pcell.

6. The method according to claim 5, wherein if a physical downlink control channel (PDCCH), which includes a carrier indication field (CIF) indicating the Scell and a position field indicating a start of the TxOP period, is received from the Pcell, the starting position of the TxOP period is configured based on an index of a subframe, at which the PDCCH is received, and the position information.

7. The method according to claim 5, wherein if a physical downlink control channel (PDCCH), which includes a carrier indication field (CIF) indicating the Scell and an extension field indicating whether the TxOP period is extended, is received from the Pcell, the TxOP period is reconfigured from a subframe configured based on an index of a subframe at which the PDCCH is received and the extension information.

8. A user equipment (UE) for transmitting and receiving data during a transmission opportunity (TxOP) period in a wireless access system supporting carrier aggregation (CA) with an unlicensed band, the UE comprising:
a transmitter;
a receiver; and
a processor for controlling the transmitter and the receiver to support data transmission and reception for the TxOP period,
wherein the processor is configured to:
receive a higher layer signal a primary cell (Pcell), the higher layer signal including configuration information which indicates a size and a use of the TxOP period by controlling the receiver,
receive a scheduling grant including scheduling information on the TxOP period at a first subframe of the TxOP period by controlling the receiver, and
transmit and receive data in accordance with the use of the TxOP period on the basis of the scheduling information in a secondary cell (S cell) during the TxOP period by controlling the transmitter or the receiver, and
wherein the size of the TxOP period is defined by a number of subframes of the Scell and the use of the TxOP period is set for downlink data transmission or uplink data transmission, wherein whether the subframes of the Scell are included in the TxOP period is determined in accordance with a transmission direction of subframes of the Pcell corresponding to the subframes of the Scell, and
wherein the Pcell is a serving cell configured in a licensed band, and the Scell is a serving cell configured in the unlicensed band.

9. The UE according to claim 8, wherein if the use of the TxOP period is for the downlink data transmission, subframes of the Scell, which correspond to a special subframe and an uplink subframe of the subframes of the Pcell, are not counted as subframes included in the TxOP period.

10. The UE according to claim 9, wherein a reservation signal is received at the subframes of the Scell, which correspond to the special subframe and the uplink subframe.

11. The UE according to claim 8, wherein if the use of the TxOP period is for the downlink data transmission, and if a downlink control channel is transmitted or a downlink pilot time slot (DwPTS) period is used at a special subframe of the subframes of the Pcell, the subframe of the Scell, which corresponds to the special subframe, is counted as a subframe included in the TxOP period.

12. The UE according to claim 9, wherein the processor is configured to receive a higher layer signal, which includes one or more of position information indicating a position where the TxOP period starts and extension information indicating whether the TxOP period is extended, from the Pcell by controlling the receiver.

13. The UE according to claim 12, wherein if a physical downlink control channel (PDCCH), which includes a carrier indication field (CIF) indicating the Scell and a position field indicating a start of the TxOP period, is received from the Pcell, the starting position of the TxOP period is configured based on an index of a subframe, at which the PDCCH is received, and the position information.

14. The UE according to claim 12, wherein if a physical downlink control channel (PDCCH), which includes a carrier indication field (CIF) indicating the Scell and an extension field indicating whether the TxOP period is extended, is received from the Pcell, the TxOP period is reconfigured from a subframe configured based on an index of a subframe at which the PDCCH is received and the extension information.

* * * * *